(12) United States Patent
Ichinose

(10) Patent No.: US 9,421,424 B2
(45) Date of Patent: Aug. 23, 2016

(54) GOLF BALL

(71) Applicant: NIKE, Inc., Beaverton, OR (US)

(72) Inventor: Jun Ichinose, Kodaira Tokyo (JP)

(73) Assignee: NIKE, Inc., Beaverton, OR (US)

( * ) Notice: Subject to any disclaimer, the term of this patent is extended or adjusted under 35 U.S.C. 154(b) by 201 days.

(21) Appl. No.: 13/906,397

(22) Filed: May 31, 2013

(65) Prior Publication Data

US 2014/0357405 A1    Dec. 4, 2014

(51) Int. Cl.
*A63B 45/00* (2006.01)
*A63B 37/00* (2006.01)
*B29C 33/00* (2006.01)
*B29C 45/00* (2006.01)

(52) U.S. Cl.
CPC .......... *A63B 37/0023* (2013.01); *A63B 37/0006* (2013.01); *A63B 37/0011* (2013.01); *A63B 37/002* (2013.01); *A63B 37/0075* (2013.01); *A63B 45/00* (2013.01); *B29C 33/005* (2013.01); *B29C 2045/0034* (2013.01)

(58) Field of Classification Search
CPC .................. B29C 2045/0034; B29C 45/0025; B29C 33/005; B29C 33/303; B29C 43/027; B29C 43/003; B29C 43/012; B29C 37/02; A63B 37/0006; A63B 37/0004; A63B 37/0003; A63B 37/0073; A63B 37/0074; A63B 45/00

See application file for complete search history.

(56) References Cited

U.S. PATENT DOCUMENTS

| | | | |
|---|---|---|---|
| 4,653,758 A * | 3/1987 | Solheim | 473/377 |
| 7,422,529 B2 | 9/2008 | Aoyama et al. | |
| 7,431,670 B2 | 10/2008 | Nardacci et al. | |
| 7,618,333 B2 | 11/2009 | Nardacci et al. | |
| 2004/0041297 A1* | 3/2004 | Sajima et al. | 264/161 |
| 2005/0201418 A1* | 9/2005 | Aoyama et al. | 370/480 |
| 2009/0023520 A1* | 1/2009 | Ninomiya et al. | 473/383 |
| 2009/0102097 A1* | 4/2009 | Sajima | 264/299 |
| 2009/0247328 A1* | 10/2009 | Kamino et al. | 473/383 |
| 2010/0052219 A1* | 3/2010 | Sajima | 264/299 |
| 2010/0179000 A1* | 7/2010 | Nakajima et al. | 473/351 |
| 2012/0157238 A1* | 6/2012 | Stefan | 473/378 |

* cited by examiner

*Primary Examiner* — John E Simms, Jr.
(74) *Attorney, Agent, or Firm* — Quinn Law Group, PLLC

(57) ABSTRACT

A golf ball includes a core and a cover surrounding the core. The cover includes a first hemispherical half and a second hemispherical half that define a seam line therebetween and along an outer surface of the cover. The seam line is non-planar and includes a repeating trapezoidal wave having a first portion disposed at a first latitude, a second portion disposed at a second latitude, and a linear ramping transition between the first portion and the second portion. The seam line further includes a first curvilinear wave superposed within the first portion of the trapezoidal wave, and a second curvilinear wave superposed within the second portion of the trapezoidal wave.

22 Claims, 4 Drawing Sheets

GOLF BALL

TECHNICAL FIELD

The present invention relates generally to a golf ball and a seam line profile for a golf ball.

BACKGROUND

Golf is a recreational game that involves repeatedly striking a ball with a club that is swung along an arcuate path. When the ball is struck by the club, the ball will typically become airborne to traverse a particular flight path/trajectory, and may have a particular spin rate.

In conventional golf ball design, a plurality of dimples are included on the outer surface of the golf ball in an effort to create a generally more stable, and longer flight trajectory when properly struck. The interaction between the dimples and the oncoming airstream affect the lift, drag, and flight stability characteristics of the ball; however, the consistency of these effects is dependent on the even distribution and/or symmetry of the dimple pattern around ball.

Golf balls are formed from polymeric materials that are typically injection molded or compression molded into a spherical shape. In either of these molding processes, two molds (two halves of a mold) may meet at a common interface, and may cooperate to define a void that forms the exact shape of the ball. Using understood injection molding or compression molding techniques the ball may be formed within this void. When the ball is removed from the molds, the ball may have molding flash or other excess material that may have been formed at the interface between the molds. As such, the molding flash may be located at or proximate to the "equator" of the golf ball.

Molding flash must be removed prior to engaging in a coating process to apply a surface coating to the golf ball. In conventional processes, the flash may be removed from the ball using any combination of cutting, grinding, sanding, tumbling with an abrasive media, and/or cryogenic deflashing. These processes are exceptionally easier and more consistent to perform when the flash extends only from a flat, non-dimpled portion (i.e., a "land area") of the ball. As such, the common interface between the molds may define a seam line that circumscribes the ball, and which is devoid of dimples. As noted above, this profile may affect the flight pattern of the ball if not properly designed or accounted for.

SUMMARY

A golf ball includes an outer spherical surface and a non-planar seam line disposed on the outer spherical surface. The seam line includes a repeating trapezoidal wave having a first portion disposed at a first latitude, a second portion disposed at a second latitude, and a linear ramping transition between the first portion and the second portion. A first curvilinear wave is superposed within the first portion of the trapezoidal wave, and a second curvilinear wave is superposed within the second portion of the trapezoidal wave.

The golf ball may further include a plurality of dimples disposed on the outer surface, and adjacent to the seam line. The seam line may not intersect any of the plurality of dimples.

In one configuration, the wavelength of the first curvilinear wave may be less than 75% of the length of the first portion of the trapezoidal wave. Likewise, the wavelength of the second curvilinear wave may be less than 75% of the length of the second portion of the trapezoidal wave. In another configuration, the wavelengths of each of the first and second curvilinear waves may be less than 40% of the respective lengths of the first and second portions of the trapezoidal wave.

Each of the first and second curvilinear waves may be centered within the respective first and second portions of the trapezoidal wave, and the trapezoidal wave may be piecewise continuous between the first portion, the linear ramping portion, and the second portion.

In one configuration, the first curvilinear wave includes three critical points where the slope of the wave turns parallel with the equator/latitudes of the ball, or where the slope is undefined. One of the plurality of dimples may be disposed directly adjacent to each of the three respective critical points such that the first curvilinear wave partially circumscribes each of the directly adjacent dimples.

The golf ball may further include a first pole and a second pole, with the seam line being disposed between the first pole and the second pole. Each of the first and second latitudes may have a respective center of curvature disposed on an axis extending between the first pole and the second pole.

In another configuration, the golf ball may include a core and a cover surrounding the core. The cover may have a first hemispherical half and a second hemispherical half that define a seam line therebetween and along an outer surface of the cover. As with the configuration described above, the seam line is non-planar and includes a repeating trapezoidal wave having a first portion disposed at a first latitude, a second portion disposed at a second latitude, and a linear ramping transition between the first portion and the second portion. The seam line further includes a first curvilinear wave superposed within the first portion of the trapezoidal wave, and a second curvilinear wave superposed within the second portion of the trapezoidal wave.

The above features and advantages and other features and advantages of the present invention are readily apparent from the following detailed description of the best modes for carrying out the invention when taken in connection with the accompanying drawings.

DETAILED DESCRIPTION

Figure 1:
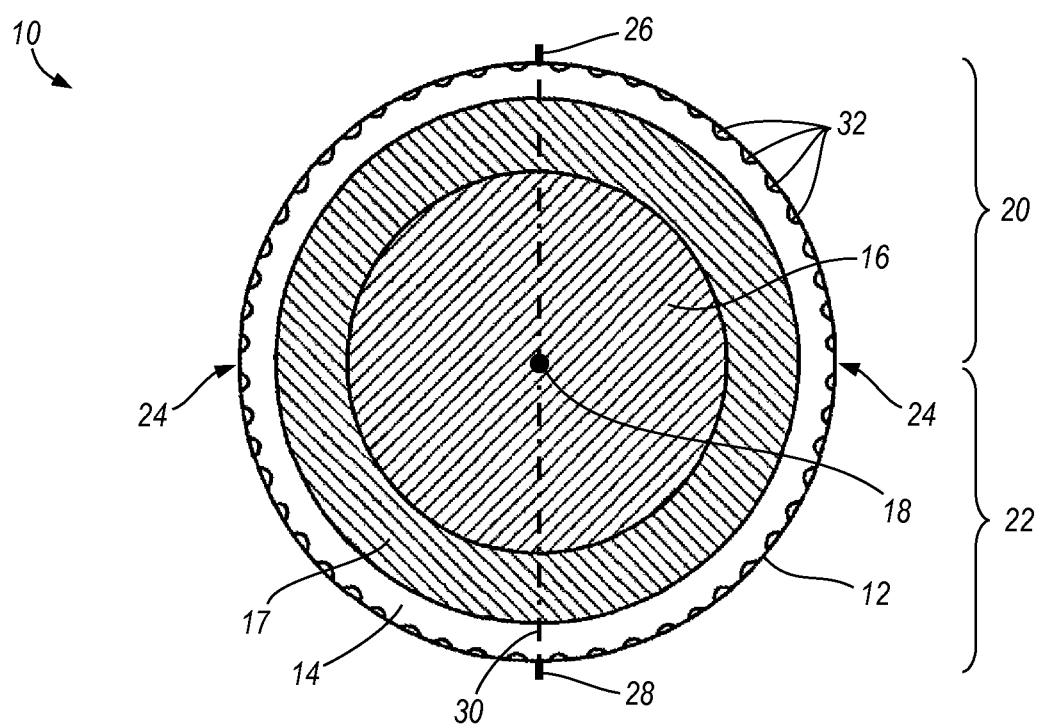
FIG. 1 is a schematic cross-sectional view of a golf ball having a core and a cover.

Referring to the drawings, wherein like reference numerals are used to identify like or identical components in the various views, FIG. 1 schematically illustrates a schematic cross-sectional view of a golf ball 10. As shown, the golf ball 10 has an outer spherical surface 12 that is defined by a cover 14. In the embodiment shown, the golf ball 10 has a three-piece construction, with the cover 14 surrounding a core 16 via an intermediate layer 17. In any case, each layer (including the core and cover), may be substantially concentric with every other layer such that every layer shares a common spherical center 18. Additionally, the mass-distribution of each layer may be uniform such that the center of mass for each layer and the ball as a whole is coincident with the common spherical center 18.

The cover 14 of the golf ball 10 may be formed through compression molding or injection molding, and may include a first hemispherical half 20 and a second hemispherical half 22, which cooperate to surround the core 16. The first and second hemispherical halves 20, 22 may define a seam line 24 that extends along the outer surface 12. In general, the seam line 24 may be a byproduct of the cover fabrication, where excess cover material is slightly expelled from between two molding dies. Said another way, during fabrication, residual mold flash may be formed on the surface 12 of the ball 10 at the interface where two molding dies meet. This mold flash may be removed through subsequent processes, however such processes are easier to perform when the seam line 24/flash resides on a land area (i.e., an undimpled portion) of the ball 10.

In general, the golf ball 10 may define a first pole 26 disposed within the first hemispherical half 20, and a second pole 28 disposed within the second hemispherical half 22. The first and second poles 26, 28 may respectively be situated at opposing sides of the ball 10, and may define a primary axis 30 of the ball 10. The seam line 24 may be disposed between the first and second poles 26, 28, and may generally circumscribe the primary axis 30.

A golf ball 10 may have any desired number of dimples 32, including, for example, between 280 and 432 total dimples, and in some examples, between 300 and 392 total dimples, and typically between 298 to 320 total dimples. In one configuration, the dimples 32 may be sized to include at least four different dimple types, and in some configurations, between 4 and 16 different dimple types, or even between 5 and 12 different dimple types. As will be explained in more detail below, a dimple is of a different "type" from another dimple if it differs from the other dimple in any significant manner, such as, for example, dimple depth, dimple radius, dimple diameter, dimple cross sectional shape (e.g., single radius, double radii, polygonal shape, faceted internal surfaces, etc.), dimple volume, dimple surface area, etc.

In one particular configuration, a golf ball 10 may include: (a) a first dimple type having a first diameter (e.g., within a range of 2 to 3 mm); (b) a second dimple type having a second diameter (e.g., within a range of 3 to 3.6 mm) that is larger than the first diameter; (c) a third dimple type having a third diameter (e.g., within a range of 3.2 to 3.8 mm) that is larger than the second diameter; (d) a fourth dimple type having a fourth diameter (e.g., within a range of 3.4 to 4 mm) that is larger than the third diameter; and (e) a fifth dimple type having a fifth diameter (e.g., within a range of 3.6 to 4.4 mm) that is larger than the fourth diameter. Additionally, more dimple types may be provided in the dimple pattern, including at least a sixth dimple type having a sixth diameter (e.g., within a range of 4 to 6 mm) that is larger than the fifth diameter. In some example balls where five dimple types are present, these example balls may include: at least 36 dimples of the first dimple type; at least 24 dimples of the second dimple type; at least 26 dimples of the third dimple type; at least 30 dimples of the fourth dimple type; and at least 246 dimples of the fifth dimple type. In some example balls where six dimple types are present, the balls may include: at least 18 dimples of the first dimple type; at least 12 dimples of the second dimple type; at least 6 dimples of the third dimple type; at least 36 dimples of the fourth dimple type; at least 270 dimples of the fifth dimple type; and at least 18 dimples of the sixth dimple type.

Figure 2:
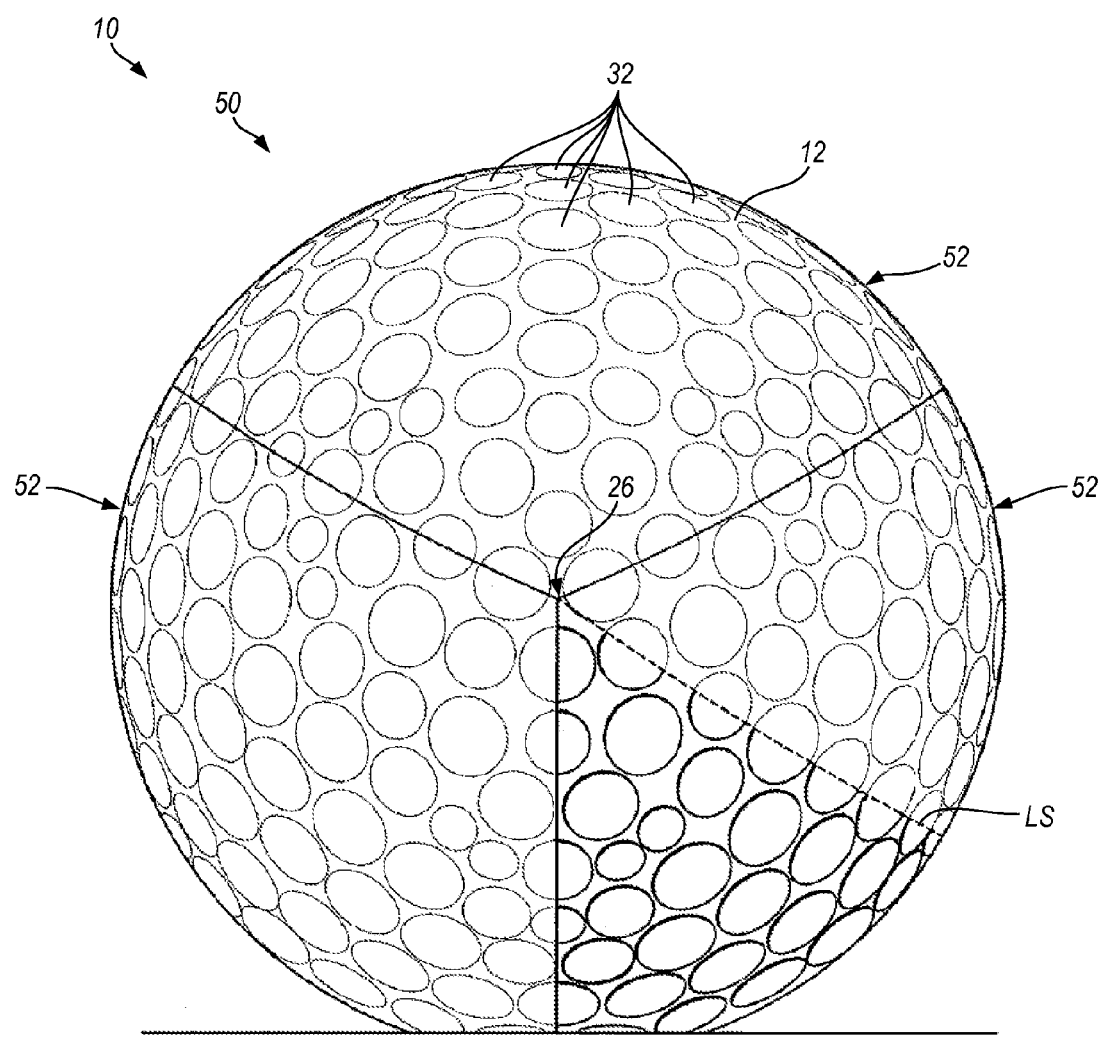
FIG. 2 is a schematic top view of a golf ball having a repeating dimple pattern.

As generally illustrated in the top view 50 of a golf ball 10 provided FIG. 2, the dimples 32 disposed on the outer surface 12 of the cover 14 may be arranged in N repeating sectors 52 in each hemispherical half, wherein N is an integer within the range of 2 to 10. In more specific embodiments, the integer N may be between, for example, 2 and 8, or even between 3 and 6. In the specific example provided in FIG. 2, each half includes 3 sectors 52 that repeat around a pole (e.g., pole 26) (each sector 52 covers 120° of the ball perimeter), for a total of 6 sectors on the overall ball 10 surface 12. Each individual sector 52 in this example dimple arrangement includes a line of symmetry LS (shown as a broken line in FIG. 2), and the individual dimples (and dimple portions) within that sector on one side of the line of symmetry LS are arranged in a mirror image from the individual dimples (and dimple portions) on the other side of the line of symmetry LS within the same sector 52. If desired, one or more sectors 52 may be provided in the dimple pattern half that do not include lines of symmetry, e.g., interspersed with the sectors that include lines of symmetry. In other words, this invention does not require that each identifiable sector of dimples on a ball must include a line of symmetry.

As shown in FIG. 2, each sector 52 is a spherical triangular region. If desired (although not required), at least some of these sectors 52 may share a common point or even a common side. In the example structure shown in FIG. 2, the sectors 52 meet at a common pole point 26 of that hemisphere. Alternatively, if desired, the sectors 52 need not share a common point (e.g., the spherical triangles may be spaced downward from the pole point 26) and/or they need not share a common edge (e.g., other, different sectors may be located between the sectors 52 having the same dimple patterns).

While the dimple pattern (i.e., the dimple layout and arrangement) on one hemispherical half 20 may be the same as the dimple pattern on the opposing hemispherical half 22, the dimples 32 are not necessarily arranged in a mirror image across the seam line 24. The dimple patterns on the respective halves may be rotationally offset from one another across the seam line 24 by an offset amount within a range of 2° to 90°, 5° to 60°, 5° to 45°, 10° to 45°, 10° to 30°, and even 15° to 30°.

Regardless of the fabrication process and dimple arrangement, the cover 14 may be made from any desired materials, including ionomeric materials (e.g., SURLYN®, available from E.I. DuPont Company of Wilmington, Del.), thermoplastic polyurethane containing materials, and the like, including conventional cover layer materials as known in the art. In a golf ball product, this cover layer 14 may have a surface hardness within a range of 44 to 60 Shore D and a nominal thickness (i.e., at thickness at a location exclusive of the dimples 32) within a range of 0.6 to 2.0 mm. The surface hardness values here are measured "on the ball" (on the exposed outer surface 12 of a cover layer 14 of a ball), at an area not including a dimple 32, using standard test method ASTM D-2240. This hardness measurement may be made before or after application of finish materials (if any) to the cover layer's 14 outer surface 12.

Figure 3:
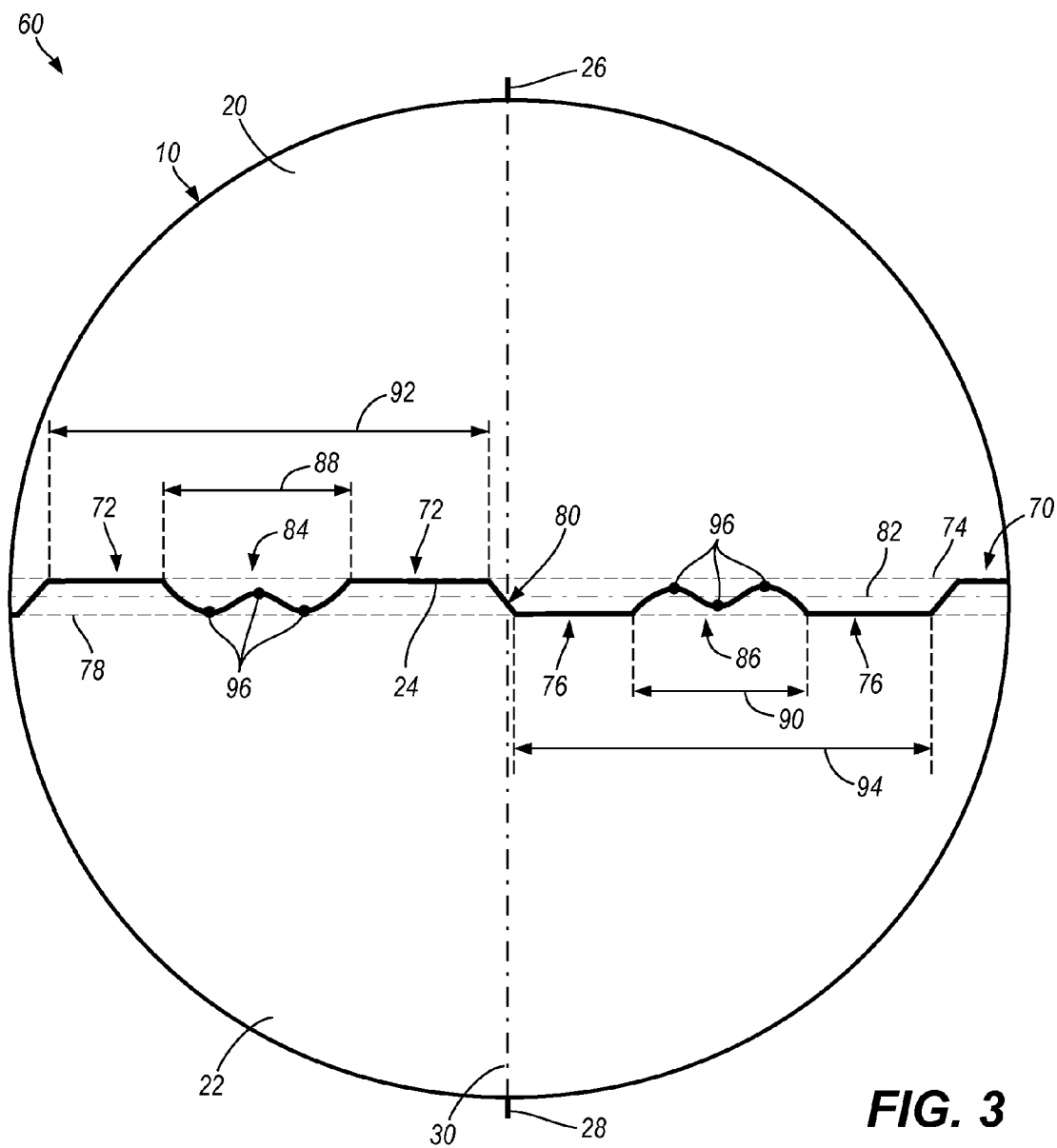
FIG. 3 is a schematic side view of a seam line disposed on an outer surface of a golf ball.

FIG. 3 illustrates a side view 60 of a golf ball 10 of the present design. As shown, the golf ball 10 includes a first hemispherical half 20, a second hemispherical half 22, and a seam line 24 disposed between the respective first and second hemispherical halves 20, 22. The first hemispherical half 20 includes a first pole 26, the second hemispherical half 22 includes a second pole 28, and a primary axis 30 extends between the first pole 26 and the second pole 28.

The seam line 24 illustrated in FIG. 3 is provided on a land area of the ball 10 (i.e., it does not intersect any dimples 32 or other surface features that have a varying radial dimension), though is non-planar itself. As shown in FIG. 3, the seam line 24 includes a repeating trapezoidal wave 70 having a first portion 72 disposed at a first latitude 74, a second portion 76 disposed at a second latitude 78, and a linear ramping transition portion 80 between the first portion 72 and the second portion 76. In this manner, the trapezoidal wave 70 is piecewise continuous between the first portion 72, the linear ramping portion 80, and the second portion 76.

As used herein, a latitude is a reference circle on the outer surface 12 of the cover 14, with all points on the reference circle being a common distance from one of the poles 26, 28. The center of curvature for each of the first latitude 74 and second latitude 78 (along with all other latitudes that may be drawn) is respectively disposed on the primary axis 30 extending between the first pole 26 and the second pole 28. In one configuration, the first latitude 74 may be disposed on a first side of an equator 82 (i.e., a latitude that is equidistant between each of the first and second poles 26, 28), and the second latitude 78 may be disposed on a second side of the equator 82. In one configuration, the first and second latitudes 74, 78 may be spaced between 0.5 mm and 6.0 mm apart from each other (along the outer surface 12). In another configuration, the first and second latitudes 74, 78 may be spaced between 0.8 mm and 4.0 mm apart from each other. In still another configuration, the first and second latitudes 74, 78 may be spaced between 1.0 mm to 2.0 mm apart from each other.

A first curvilinear wave 84 may be superposed within the first portion 72 of the trapezoidal wave 70, and a second curvilinear wave 86 may be superposed within the second portion 76 of the trapezoidal wave 70. In one configuration, the first curvilinear wave 84 may be identical to the second curvilinear wave 86. In another configuration, the second curvilinear wave 86 may be a mirror of the first curvilinear wave 84 along either one or two axes. In still another configuration, the first curvilinear wave 84 may be entirely different from the second curvilinear wave 86.

As further illustrated in FIG. 3, the first curvilinear wave 84 may have a first wavelength 88, and the second curvilinear wave 86 may have a second wavelength 90. Additionally, the first portion 72 of the trapezoidal wave 70 has a first length 92 along the first latitude 74 and the second portion 74 of the trapezoidal wave 70 has a second length 94 along the second latitude 78. In one configuration, the first wavelength 88 may be less than 75% of the first length 92, and the second wavelength 90 may be less than 75% of the second length 94. In another configuration, the first and second wavelengths 88, 90 may be less than 40% of the respective first and second lengths 92, 94. Additionally, the first curvilinear wave 84 may be centered within the first portion 72 of the trapezoidal wave 70, and the second curvilinear wave 86 may centered within the second portion 74 of the trapezoidal wave 70.

In one configuration, one or both of the curvilinear waves 84, 86 may have exactly three critical points 96. In conventional mathematics, a "critical point" is a point within a wave where the slope is zero or undefined. As used here, a "critical point" is a point within the curvilinear wave where the slope is substantially parallel to the equator 82. As such, a wave with three critical points 96 may generally resemble the letter M. In a wave such as this, each of the first and second curvilinear waves 84, 86 may be substantially or entirely disposed between the first and second latitudes 74, 78.

Figure 4:
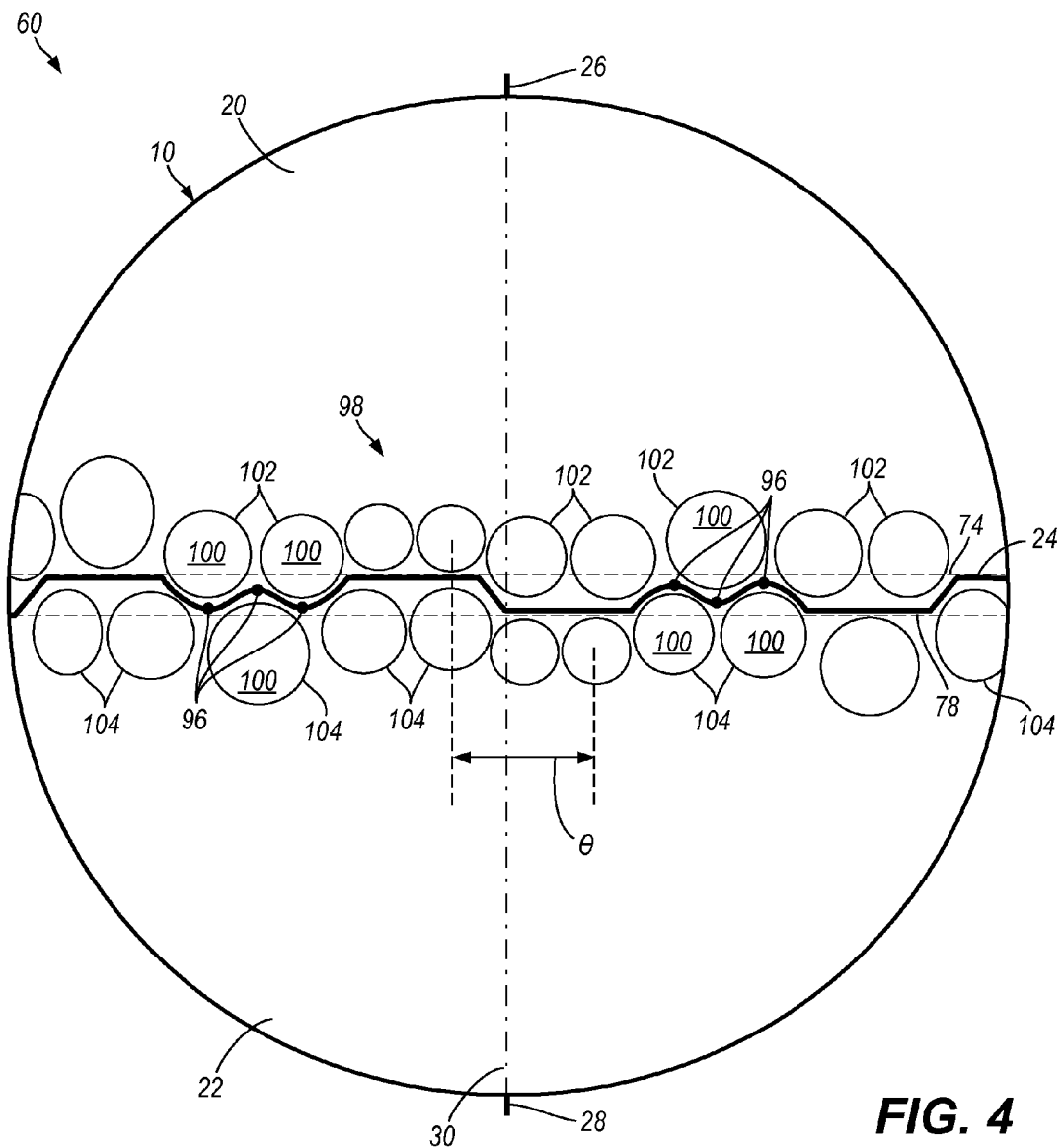
FIG. 4 is a schematic side view of a seam line disposed on an outer surface of a golf ball, including a plurality of dimples disposed adjacent to the seam line.

FIG. 4 illustrates the seam line 24 relative to a subset of dimples 98 that are disposed on the outer surface 12 of the cover 14, directly adjacent to the seam 24. As used herein, "directly adjacent" is intended to mean that there are no intermediate features between the dimples 98 and the seam 24. It should be readily apparent that a substantial number of dimples have been omitted from FIG. 4 for clarity. As further shown, the seam line 24 does not intersect any of the directly adjacent dimples 98, and is entirely disposed on a single, continuous surface 12 of the ball 10. As shown, the dimples 98 may be of varying types/sizes, though the dimple pattern of the first hemispherical half 20 may be offset from the dimple pattern of the second hemispherical half 22 by an angle θ. In one configuration, the angle θ may be between approximately 15° and 30°.

As shown, a dimple 100 may be disposed directly adjacent to each of the critical points 96 for each of the first and second curvilinear waves 84, 86. In this manner, the seam profile 24 may partially circumscribe each of these adjacent dimples 100. Additionally, a first subset 102 of the dimples 98 may be intersected by the first latitude 74, and a second subset 104 of the dimples 98 may be intersected by the second latitude 78.

By including straight sections in the present seam line profile, the amount of grinding/flash removal that is required post-fabrication may be greatly easier and reduced over a purely sinusoidal seam line. Conversely, the various transition sections and curvilinear waves may still allow for a high degree of interdigitation between the two hemispherical halves 20, 22 of the cover 14. Also, a buffing band width along the parting line can be narrower via the generally small distance between the first and second latitudes 74, 78 in FIG. 3.

While the best modes for carrying out the invention have been described in detail, those familiar with the art to which this invention relates will recognize various alternative designs and embodiments for practicing the invention within the scope of the appended claims. The present invention should not be limited to any particular dimple pattern, except as may be required by the appended claims. It is intended that all matter contained in the above description or shown in the accompanying drawings shall be interpreted as illustrative only and not as limiting.

The invention claimed is:

1. A golf ball having an outer spherical surface, the golf ball comprising:
    a non-planar seam line disposed on the outer spherical surface and including:
        a repeating trapezoidal wave having a first linear portion disposed on a first latitude of the outer spherical surface, a second linear portion disposed on a second latitude of the outer spherical surface, and a linear ramping transition between the first linear portion and the second linear portion;
        a first curvilinear wave superposed within the first linear portion of the trapezoidal wave; and
        a second curvilinear wave superposed within the second linear portion of the trapezoidal wave,
    wherein each of the first curvilinear wave and the second curvilinear wave is disposed entirely between the first latitude and the second latitude, and
    wherein the first curvilinear wave is centered within the first linear portion of the trapezoidal wave, and the second curvilinear wave is centered within the second linear portion of the trapezoidal wave.

2. The golf ball of claim 1, wherein the first curvilinear wave has a first length along the first latitude, the second curvilinear wave has a second length along the second latitude, the first linear portion of the trapezoidal wave has a third length along the first latitude, and the second linear portion of the trapezoidal wave has a fourth length along the second latitude, and wherein the first length is less than 75% of the third length, and the second length is less than 75% of the fourth length.

3. The golf ball of claim 2, wherein the first length is less than 40% of the third length, and the second length is less than 40% of the fourth length.

4. The golf ball of claim 2, wherein the first curvilinear wave extends from the first latitude towards the second latitude, and the second curvilinear wave extends from the second latitude towards the first latitude.

5. The golf ball of claim 1, wherein the first curvilinear wave includes three critical points.

6. The golf ball of claim 5, further comprising a plurality of dimples disposed on the outer spherical surface, wherein a respective one of the plurality of dimples is disposed directly adjacent to each of the three respective critical points such that the first curvilinear wave partially circumscribes each of the directly adjacent dimples.

7. The golf ball of claim 1, wherein the trapezoidal wave is piecewise continuous between the first portion, the linear ramping portion, and the second portion.

8. The golf ball of claim 1, wherein the seam line includes an integral number of repeating trapezoidal waves.

9. The golf ball of claim 1, further comprising a plurality of dimples disposed on the outer spherical surface, wherein the seam line does not intersect any of the plurality of dimples.

10. The golf ball of claim 9, wherein the plurality of dimples includes a first subset of dimples each being respectively intersected by the first latitude, wherein the plurality of dimples includes a second subset of dimples each being respectively intersected by the second latitude.

11. The golf ball of claim 1, further comprising a first pole and a second pole, with the seam line being disposed between the first pole and the second pole; and wherein each of the first and second latitudes has a respective center of curvature disposed on an axis extending between the first pole and the second pole.

12. A golf ball comprising:
a core; and
a cover including a first hemispherical half and a second hemispherical half that cooperate to surround the core, the first hemispherical half and the second hemispherical half defining a seam line therebetween and along an outer surface of the cover,
wherein the seam line is non-planar and includes:
a repeating trapezoidal wave having a first linear portion disposed on a first latitude, a second linear portion disposed on a second latitude, and a linear ramping transition portion extending between and connecting the first linear portion and the second linear portion;
a first curvilinear wave superposed within the first linear portion of the trapezoidal wave; and
a second curvilinear wave superposed within the second linear portion of the trapezoidal wave,
wherein both the first curvilinear wave and the second curvilinear wave are disposed entirely between the first latitude and the second latitude, and
wherein the first curvilinear wave is centered within the first linear portion, and the second curvilinear wave is centered within the second linear portion.

13. The golf ball of claim 12, wherein the first curvilinear wave has a first length along the first latitude, the second curvilinear wave has a second length along the second latitude, the first linear portion of the trapezoidal wave has a third length along the first latitude, and the second linear portion of the trapezoidal wave has a fourth length along the second latitude, and wherein the first length is less than 75% of the third length, and the second length is less than 75% of the fourth length.

14. The golf ball of claim 13, wherein the first length is less than 40% of the third length, and the second length is less than 40% of the fourth length.

15. The golf ball of claim 12, wherein the first curvilinear wave includes three critical points.

16. The golf ball of claim 15, further comprising a plurality of dimples disposed on the outer surface of the cover, wherein a respective one of the plurality of dimples is disposed directly adjacent to each of the three respective critical points such that the first curvilinear wave partially circumscribes each of the directly adjacent dimples.

17. The golf ball of claim 12, wherein the trapezoidal wave is piecewise continuous between the first portion, the linear ramping portion, and the second portion.

18. The golf ball of claim 12, wherein the seam line includes an integral number of repeating trapezoidal waves.

19. The golf ball of claim 12, further comprising a plurality of dimples disposed on the outer surface of the cover, wherein the seam line does not bisect any of the dimples.

20. The golf ball of claim 19, wherein the plurality of dimples includes a first subset of dimples each being respectively intersected by the first latitude, wherein the plurality of dimples includes a second subset of dimples each being respectively intersected by the second latitude.

21. The golf ball of claim 12, further comprising a first pole disposed within the first hemispherical half and a second pole disposed within the second hemispherical half; and wherein each of the first and second latitudes has a respective center of curvature disposed on an axis extending between the first pole and the second pole.

22. A golf ball comprising:
a core; and
a cover with a first hemispherical portion cooperating with a second hemispherical portion to surround the core, the first and second hemispherical portions defining therebetween, along an outer spherical surface of the cover, a non-planar seam line, the non-planar seam line including:
a repeating trapezoidal wave with a first linear portion extending on a first latitude line of the outer spherical surface, a second linear portion extending on a second latitude line of the outer spherical surface, and a linear ramping transition portion extending between and connecting the first linear portion and the second linear portion;
a first curvilinear wave superposed and centered within the first linear portion of the trapezoidal wave; and
a second curvilinear wave superposed and centered within the second linear portion of the trapezoidal wave,
wherein both the first curvilinear wave and the second curvilinear wave are disposed entirely between the first latitude and the second latitude.

* * * * *